US012503386B2

(12) United States Patent
Ma et al.

(10) Patent No.: US 12,503,386 B2
(45) Date of Patent: Dec. 23, 2025

(54) INDUCTIVE FURNACE WITH ROTATING SUSCEPTOR FOR HIGH PRECISION WAVEGUIDE GLASS DRAW

(71) Applicant: Heraeus Quartz North America LLC, Buford, GA (US)

(72) Inventors: Qiulin Ma, Buford, GA (US); Kai Huei Chang, Buford, GA (US)

(73) Assignee: HERAEUS QUARTZ NORTH AMERICA LLC, Buford, GA (US)

( * ) Notice: Subject to any disclaimer, the term of this patent is extended or adjusted under 35 U.S.C. 154(b) by 369 days.

(21) Appl. No.: 18/061,296

(22) Filed: Dec. 2, 2022

(65) Prior Publication Data

US 2023/0192526 A1    Jun. 22, 2023

Related U.S. Application Data

(60) Provisional application No. 63/287,245, filed on Dec. 8, 2021.

(51) Int. Cl.
*C03B 37/027* (2006.01)
*C03B 37/029* (2006.01)

(52) U.S. Cl.
CPC .. *C03B 37/02718* (2013.01); *C03B 37/02736* (2013.01); *C03B 37/02781* (2013.01); *C03B 37/029* (2013.01); *C03B 2205/64* (2013.01)

(58) Field of Classification Search
None
See application file for complete search history.

(56) References Cited

U.S. PATENT DOCUMENTS 7,814,767 B2 * 10/2010 Roba .................. H05B 6/20
65/513

FOREIGN PATENT DOCUMENTS

| CN | 1354731 A | 6/2002 |
| CN | 1594155 A | 3/2005 |
| CN | 103058511 A | 4/2013 |

(Continued)

OTHER PUBLICATIONS

CN-105819680-B EPO Machine Translation Retrieved Apr. 11, 2025. (Year: 2025).*

(Continued)

*Primary Examiner* — Lisa L Herring
(74) *Attorney, Agent, or Firm* — Panitch Schwarze Belisario & Nadel LLP

(57) ABSTRACT

A drawing furnace for drawing a glass element includes: a furnace body having an upper end and a lower end. The furnace body includes a top annular plate, an A/C induction coil capable of accepting electrical current and producing an oscillating electronic signal, a cylindrical susceptor capable of producing heat output, a cylindrical quartz beaker, an insulating material disposed between the susceptor and the beaker, and a bottom annular plate housing and supporting at least one of the susceptor, the beaker, and the insulating material. wherein the furnace body comprises a central longitudinal axis; A rotational drive system operably connected to the bottom annular plate by an annular rotation gear system rotates the bottom annular plate along with the susceptor, beaker, and/or insulating material at a frequency between 0.01 to 10 Hz. The electrical current and oscillation frequency determine the heat output of the susceptor.

20 Claims, 14 Drawing Sheets

(56) References Cited

FOREIGN PATENT DOCUMENTS

| | | | | |
|---|---|---|---|---|
| CN | 105819680 B | * | 5/2018 | ......... C03B 37/0253 |
| CN | 109836036 A | | 6/2019 | |
| CN | 108383372 B | | 8/2020 | |
| EP | 1518834 A1 | | 3/2005 | |
| GB | 1575299 A | * | 9/1980 | ........... C03B 37/029 |
| JP | H0196042 A | | 4/1989 | |
| JP | 2004131353 A | | 4/2004 | |
| WO | 2019105038 A1 | | 6/2019 | |

OTHER PUBLICATIONS

WO2019105038A1 EPO Machine Translation Retrieved Apr. 10, 2025. (Year: 2025).*

* cited by examiner

INDUCTIVE FURNACE WITH ROTATING SUSCEPTOR FOR HIGH PRECISION WAVEGUIDE GLASS DRAW

CROSS-REFERENCE TO RELATED APPLICATIONS

This application claims priority pursuant to 35 U.S.C. 119(a) to U.S. application Ser. No. 63/287,245, filed Dec. 8, 2021, which application is incorporated herein by reference in its entirety.

FIELD

This disclosure relates to a furnace for and method of drawing optical fibers, optical fiber preforms, optical waveguide substrate/jacket tubes and specifically to an induction furnace for drawing optical fiber, optical fiber preforms, optical waveguide substrate/jacket tubes from large glass preforms, cylinder-core rod assemblies, cylinders and method for drawing these glass bodies. More specifically, this disclosure relates to an apparatus and method of evenly heating a susceptor circumferentially to minimize or eliminate defects in the drawn tubes, drawn preforms, drawn fibers and, especially, in hollow fibers.

BACKGROUND OF THE INVENTION

Optical fiber drawing is a procedure of completing fiber drawing and forming after melting an optical fiber preformed rod at a high temperature through a fiber drawing furnace. The existing optical fiber drawing furnace heating apparatus is mainly formed of a furnace casing, an exothermic sleeve mounted in the furnace cavity, a heat-insulation layer mounted around the exothermic sleeve, and an induction coil. Optical waveguide tubes and preforms drawing on the other hand have much larger forming zone than fiber draw, which requires much higher power than fiber draw, usually delivered by resistance heater.

Vertical drawing methods employing such furnaces serve to form hollow cylinders of quartz glass without any tools into tubes of any desired cross-sectional profile. A hollow cylinder is here normally supplied in vertical orientation from above to a heating tube, it is softened therein zone by zone and a tube strand is drawn from the softened region, with a drawing bulb being formed in the softened region.

On the one hand the absence of tools in this forming process yields a low-damage surface of the withdrawn strand. On the other hand, however, the problem arises that the dimensional stability of the withdrawn strand must be ensured without any mechanical intervention. This is particularly rendered difficult by already existing dimensional variations of the hollow cylinder, which tend to continue in the withdrawn tube strand or are even enhanced there. The most frequently found flaws are high-frequency diameter variations and ovalities in the radial cross-sectional profile or wall one-sidedness, i.e., radial irregularities in the thickness of the tube wall, also called "siding" among the experts.

Siding flaws are largely formed as a result of an asymmetric circumferential temperature profile around the susceptor in the zone of the drawing bulb. There are many causes of circumferential temperature asymmetry of the susceptor such as, for example, the helical shape of the coil, misalignment of the susceptor axis with respect to the coils, and non-uniform wall thickness of the susceptor. Circumferential temperature symmetry is especially important when drawing hollow fibers comprising an internal geometry because slight temperature variations around a susceptor will translate to temperature variations in the drawing fiber, which can deform or at worse destroy the internal geometry of the hollow fiber.

An induction furnace with a susceptor as the heating element is widely used as the draw furnace in telecom fiber industry. But it has rarely been used as tube or preform draw furnace, mainly due to its limited power, limited length of heating zone as well as limited draw throughput it can support. Recent technology advancement of inductive heating has made it possible to achieve enough power for preform or tube draw from ~200 mm OD cylinders. However, for tube (or preform) draw, with a much longer forming zone than standard telecom fiber draw, the symmetric geometry precisions such as ovality, siding and eccentricity, are much more sensitive to the circumferential temperature symmetry of the induction furnace. Furthermore, in the newly developed NANF HCF preform making and fiber drawing processes, precise tubing geometries and the related symmetry inside the cane need to be well maintained for its designed waveguide performances. Therefore, the drawing yield is also highly sensitive to the circumferential temperature asymmetry of the oven.

For the relevant temperature range (typically >2100° C.), full temperature profile measurement for the induction furnace is of great technical challenge and it is very difficult to do accurately. Therefore, the temperature symmetry inside the furnace is very hard to determine through direct measurements Accordingly, there is a need in the art for an apparatus and method for drawing an optical fiber from a glass preform that will impart a circumferential temperature symmetry to the fiber as it is being drawn to substantially eliminate the above-identified defects.

BRIEF SUMMARY OF THE INVENTION

This disclosure satisfies this need by providing a drawing furnace for drawing a glass element, the furnace comprising: a furnace body having an upper end comprising an opening and a lower end comprising an opening, wherein the furnace body comprises: i. a top annular plate, ii. an A/C induction coil capable of accepting a level of electrical current and producing an oscillating electronic signal oscillating at a frequency, iii. a cylindrical susceptor capable of producing a level of heat output, iv. a cylindrical quartz beaker, v. an insulating material disposed between the cylindrical susceptor and the cylindrical quartz beaker component, and vi. a bottom annular plate housing and supporting at least one of the cylindrical susceptor, the cylindrical quartz beaker component, and the insulating material, wherein the furnace body comprises a central longitudinal axis; and a rotational drive system operably connected to the bottom annular plate by an annular rotation gear system, wherein when the rotational drive system is engaged with the annular rotation gear system such that the bottom annular plate rotates along with at least one of the cylindrical susceptor, the cylindrical quartz beaker component, and the insulating material about the central axis at a frequency of from 0.01 to 10 Hz, and wherein the level of electrical current and the frequency of oscillating determines the level of heat output of the susceptor.

In another aspect, this disclosure provides a method of distributing heat evenly in a circumferential direction around a susceptor in a furnace during the drawing of a glass element, the method comprising the steps of: heating by induction a drawing furnace by providing an A/C electrical current, the drawing furnace comprising: a furnace body having an upper end comprising an opening and a lower end comprising an opening, wherein the furnace body comprises: i. a top annular plate, ii. an A/C induction coil capable of accepting a level of electrical current and producing an oscillating electronic signal oscillating at a frequency, iii. a cylindrical susceptor capable of producing a level of heat output, iv. a cylindrical quartz beaker, v. an insulating material disposed between the cylindrical susceptor and the cylindrical quartz beaker component, and vi. a bottom annular plate housing and supporting at least one of the cylindrical susceptor, the cylindrical quartz beaker component, and the insulating material, wherein the furnace body comprises a central longitudinal axis; and a rotational drive system operably connected to the bottom annular plate by an annular rotation gear system; and engaging the rotational drive system and the annular rotation gear system to rotate the bottom annular plate such that the bottom annular plate rotates along with at least one of the cylindrical susceptor, the cylindrical quartz beaker component, and the insulating material circumferentially about the central axis at a frequency of from 0.10 to 10 Hz, and wherein the level of electrical current and the frequency of oscillating determines the level of heat output of the susceptor.

In another aspect, this disclosure provides a method of forming an optical glass element in a furnace, the furnace including a furnace body having a top annular plate, an A/C induction coil, a cylindrical susceptor, a cylindrical quartz beaker, an insulating material disposed between the susceptor and the beaker, and a bottom annular plate, and a rotational drive system operably connected to the bottom annular plate by an annular rotation gear system, the method comprising: introducing a glass body into the furnace body through an opening in the top annular plate; engaging the rotational drive system to the annular rotation gear system and rotating, while drawing the glass body through the furnace body, the bottom annular plate along with at least one of the cylindrical susceptor, the cylindrical quartz beaker, or the insulating material about a central axis of the furnace body at a frequency of from 0.01 to 10 Hz; inductively heating the susceptor via a magnetic field created by the A/C induction coil receiving electrical current; heating the glass body in the susceptor; and feeding the produced optical glass element through an opening in the bottom annular plate. The glass body may be one of a glass preform, a glass cylinder-core rod assembly, a glass cylinder, or the like. The optical glass element may be one of an optical fiber, in particular a hollow optical fiber, or an optical fiber preform, an optical waveguide, a tube, or the like. The rotational frequency may more particularly be of from 0.05 to 0.15 Hz, and more particularly, 0.1 Hz.

The embodiments of the invention can be used alone or in combinations with each other.

DETAILED DESCRIPTION OF THE INVENTION

Figure 1:
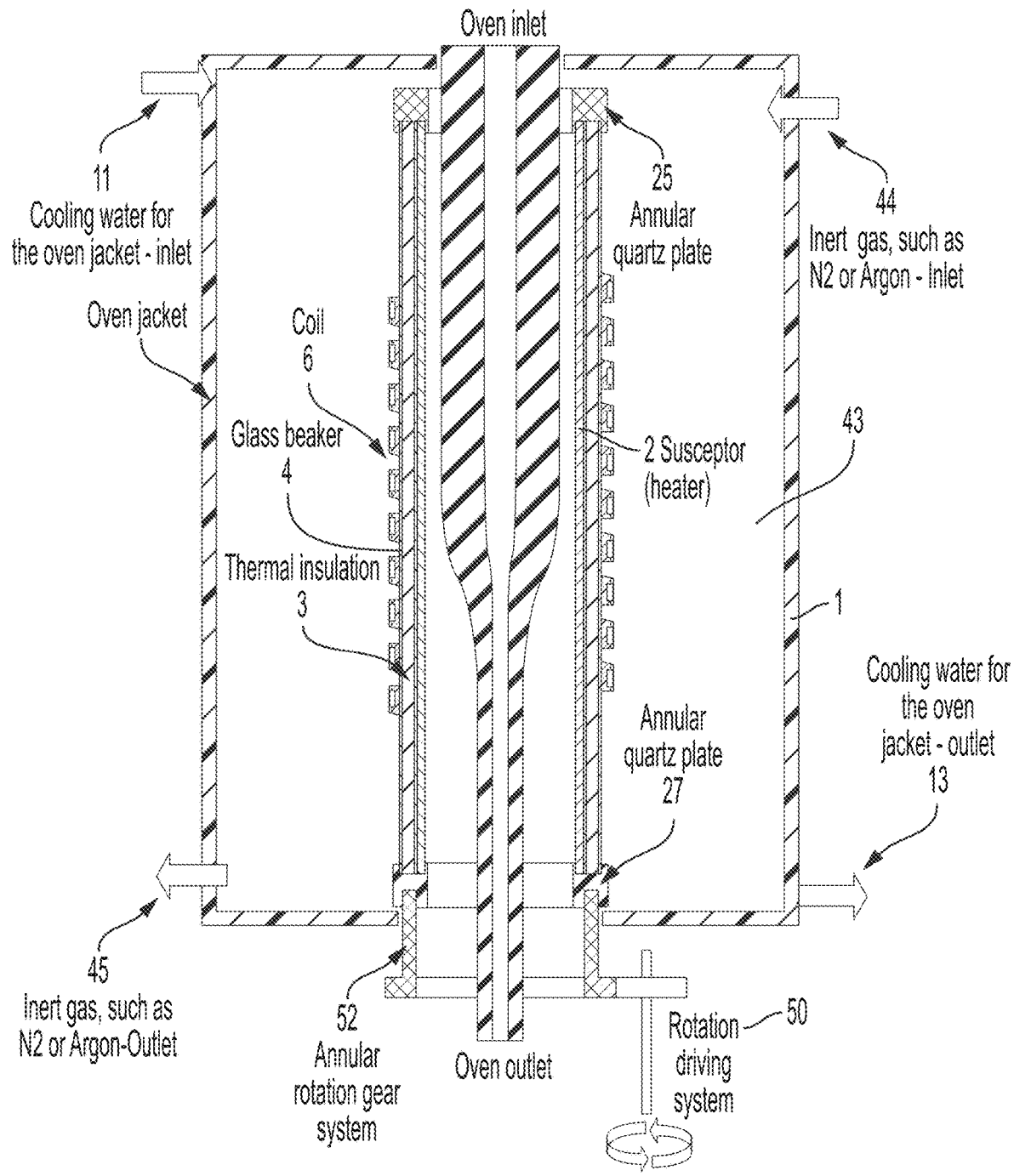
FIG. 1 illustrates a high-level, schematic cross-sectional view on a plane through the diameter of a furnace for drawing optical fiber according to this disclosure.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. Various changes may be made in the function and arrangement of elements without departing from the spirit and scope of the invention, as set forth in the appended claims.

For purposes of this specification and accompanying claims, the term "drawing furnace" means a furnace that can be used to draw a glass element such as, for example, an optical preform into an optical fiber or to stretch and collapse a cylinder-core rod assembly into a preform or to stretch a glass cylinder into a tube.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Hollow core fiber (HCF), such as the NANF HCF, requires excellent circumferential temperature symmetry to maintain the tubing geometries in the cane. Desired tube geometry tolerance gets significantly tighter, with ovality target at <=0.1% of tube OD, siding target at <=1% of tube wall thickness and CSA variation of less than 1%—all of which significantly reduces our tube draw yield.

Disclosed herein to meet or exceed such requirements is a drawing furnace for drawing a glass element, the furnace comprising: a furnace body having an upper end comprising an opening and a lower end comprising an opening, wherein the furnace body comprises i. a top annular plate, ii. an A/C induction coil capable of accepting a level of electrical current and producing an oscillating electronic signal oscillating at a frequency, iii. a cylindrical susceptor capable of producing a level of heat output, iv. a cylindrical quartz beaker, v. an insulating material disposed between the cylindrical susceptor and the cylindrical quartz beaker component, and vi. a bottom annular plate housing and supporting at least one of the cylindrical susceptor, the cylindrical quartz beaker component, and the insulating material, wherein the furnace body comprises a central longitudinal axis; and a rotational drive system operably connected to the bottom annular plate by an annular rotation gear system, wherein when the rotational drive system is engaged with the annular rotation gear system such that the bottom annular plate rotates along with at least one of the cylindrical susceptor, the cylindrical quartz beaker component, and the insulating material about the central axis at a frequency of from 0.01 to 10 Hz, and wherein the level of electrical current and the frequency of oscillating determines the level of heat output of the susceptor.

Figure 2:
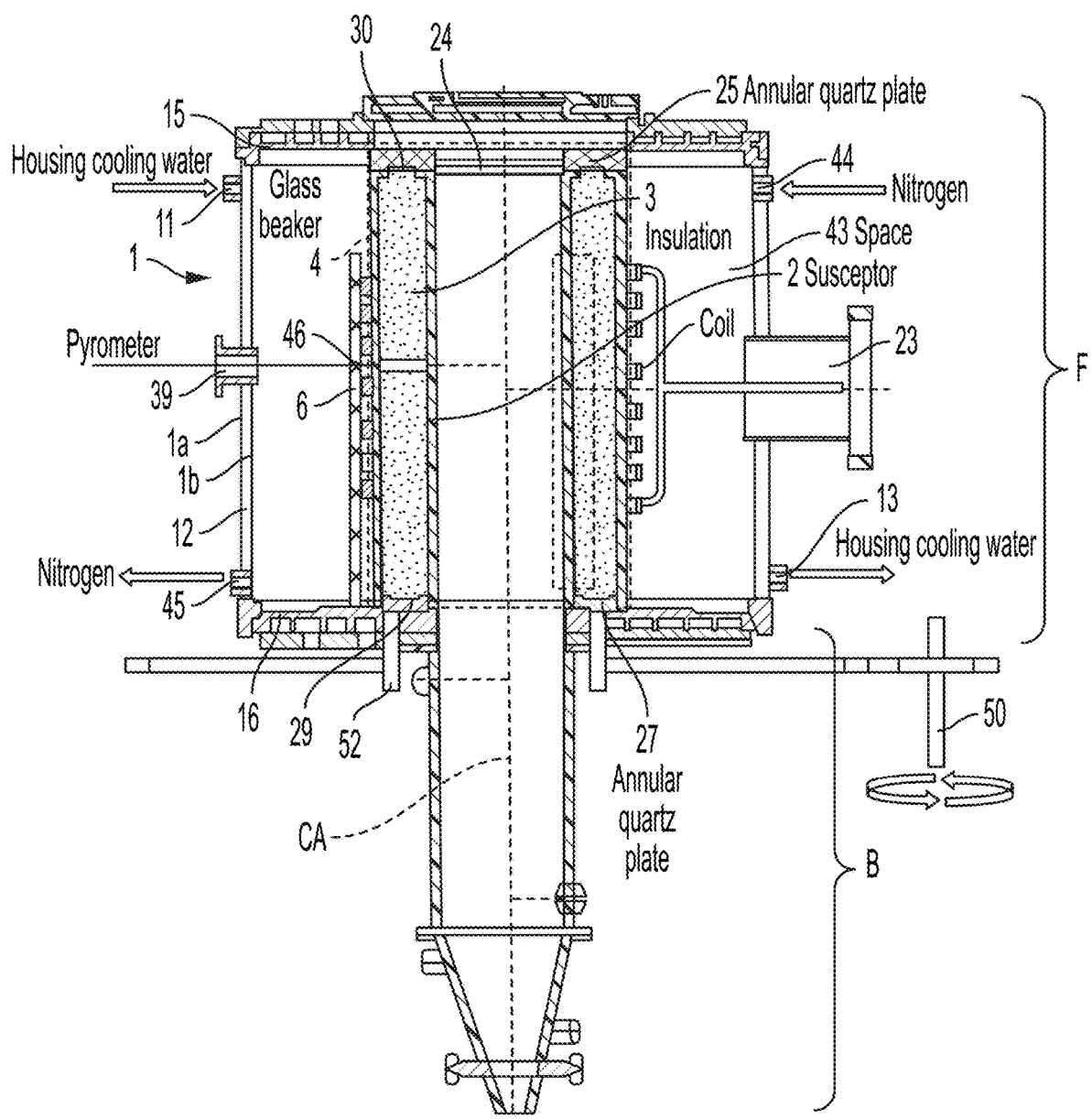
FIG. 2 illustrates a detailed cross-sectional view on a plane through a diameter of the furnace according to this disclosure.

FIG. 1 illustrates a high-level, schematic cross-sectional view on a plane through the diameter of a furnace for drawing optical fiber according to this disclosure. FIG. 1 is not to scale and does not illustrate all components of the furnace in detail. FIG. 2 illustrates a more detailed cross-sectional view (relative to that shown in FIG. 1) on a plane through a diameter of the furnace. Generally, the furnace includes a furnace body F, a top chimney (not shown), and a bottom chimney B. A preform is introduced into the furnace body through the top chimney and as the preform is drawn into fiber, the fiber exits the furnace through the bottom chimney. The furnace body has a central axis CA longitudinally through the center.

A preferred embodiment of a furnace according to the invention is illustrated in FIG. 2. The furnace body F comprises a cylindrical susceptor 2 capable of producing a level of heat output housed within the interior of a cylindrical insulator 3. Insulator 3 is in turn preferably housed inside a cylindrical quartz beaker 4. Two annular quartz plates 25 and 27 maintain the alignment of quartz beaker 4 around susceptor 2. In some embodiments, there may be a clearance, preferably of about 3-5 mm, provided between the outer surface of susceptor 2 and the inner surface of insulator 3. In certain embodiments a similar clearance may also be provided between outer surface of insulator 3 and inner surface of quartz beaker 4. These clearances, if present, allow an easier mounting of the assembly of the furnace body and easy removal and substitution of the single components of it, without interfering with the other components of the assembly.

The height of the furnace body is dimensioned so as to contain, together with the top chimney and the bottom chimney, the whole length of the preform. The height of the furnace body should be sufficiently extended so to heat the lower end of the preform in order to draw an optical fiber from it, but sufficiently reduced so to avoid unnecessary overheating of the remaining portion of the preform.

Coil 6 is an A/C induction coil capable of accepting a level of electrical current and producing an oscillating electronic signal oscillating at a frequency. Coil 6 surrounds quartz beaker 4, being positioned at a distance of about 5-6 mm from the outer surface of quartz beaker 4. Coil 6 generates an electric field, which in turn generates eddy currents and thus heating in susceptor 2 to temperatures as high as about 2200° C. All these major components, coil 6, quartz beaker 4, insulator 3 and susceptor 2 are enclosed within housing 1.

Housing 1, which can be made of metal, e.g., copper, brass or, preferably, aluminum, is closed on the top and bottom ends by annular end plates 15 and 16, each having a centrally located aperture. These end plates and housing 1 may be made, for example, of aluminum. The apertures in the end plates mate with top chimney T and bottom chimney B. The end plates and the internal wall 1*b* of housing 1 define a furnace interior.

In the embodiment illustrated in FIGS. 1 and 2, housing 1 includes two walls, exterior wall 1*a* and interior wall 1*b*, which together define an annular cooling cavity 12. The diameter and the length of the wall depends on the application of the furnace and is by no means limiting. As an example, in one embodiment, the external wall 1*a* has an outside diameter of 620 mm diameter, and internal wall 1*b* has an outside diameter of 580 mm and the height of housing 1 is about 740 mm. To cool external housing 1, a cooling fluid flows through cooling cavity 12. For instance, the space between walls 1*a* and 1*b* is cooled by a flow of water. Cooling water enters cavity 12 via a plurality of water supply pipes 11. For example, three supply pipes 11 may be distributed around the perimeter of housing 1 at 120° intervals. Water is then discharged from cavity 12 through discharge pipes 13. Preferably, the numbers of supply pipes 11 and discharge pipes 13 are equal and supply pipes 11 and discharge pipes 13 are located on opposing sides of housing 1 so that cooling water uniformly cools housing 1.

Coil 6 is electrically connected to a source of high-frequency electric current (not shown) through passage 23. Current levels in coil 6 can lead to significant levels of resistive heating. To control such heating, coil 6 may be made, for example, of copper tubing so that a cooling fluid, such as water, can be circulated through the coil 6 during operation of the furnace. The electrical field generated by the current flowing through coil 6 induces eddy currents in susceptor 2. A conditioning gas, for instance nitrogen, is preferably flown into space 43 where coil is housed, to preserve insulator and/or the susceptor from possible oxidation. Typical flow rates of this gas are from about 20 to about 30 l/min. Supply pipes 44 and discharge pipes 45 are provided onto housing 1, e.g., in the same manner as described for pipes 11 and 13, for allowing the flow of said gas into housing 1.

Figure 3:
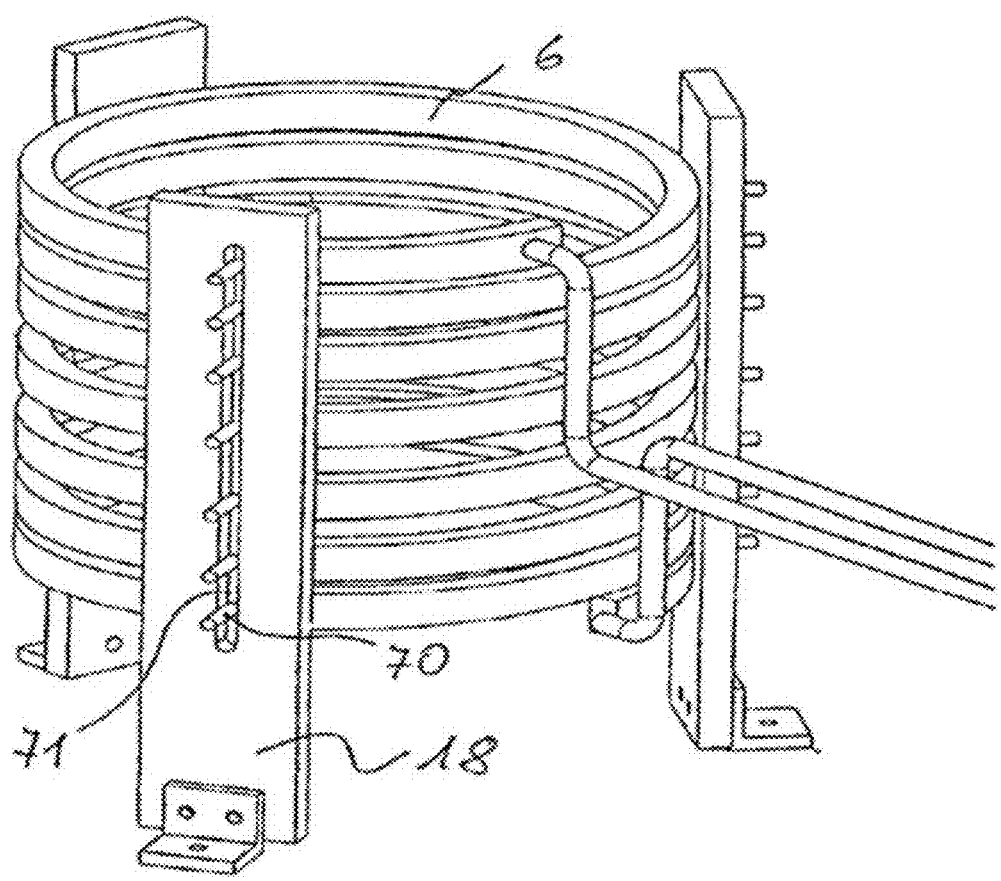
FIG. 3 illustrates an embodiment of an induction coil to be disposed within the furnace.

The structure that supports coil 6 inside housing 1 should not conduct significant electrical current, if at all. In the embodiment shown in FIG. 3, three legs 18 made of insulating ceramic material are distributed within housing 1 at 120° intervals to support coil 6 adjacent quartz beaker 4 (not shown in FIG. 3). After coil 6 has been centered inside the furnace by fixing coil supports 18, the central axis of the coil 6 is precisely aligned with respect to the central axis of the furnace by acting on pins 70 which are inserted into corresponding vertical slots 71 provided onto support 18; once the correct alignment has been accomplished, the coil is fixed in such position by fixing each pin onto support 18, e.g., by means of nuts. Alternatively, the vertical slots in supports 18 can be replaced by a series of horizontal slots, each disposed at the appropriate height where the coil turn pin is supposed to stay. With this latter embodiment mounting and alignment operation are generally easier and the centering of the coil is quite more precise and constant in time.

Susceptor 2 of a furnace according to this disclosure is typically made of graphite. In particular, the graphite susceptor material should have a relatively high thermal conductivity, preferably higher than about 50 W/m° K, e.g., of about 100 W/m° K, and a relatively low specific resistance, preferably of about $1.010^{-5}$ ohm, or lower. In one embodiment, susceptor 2 is about 6 mm thick with an inside diameter of 150 mm, making it compatible with large preforms (up to about 130 mm in diameter).

A conditioning gas is typically provided from the top chimney inside the cylindrical susceptor, for providing a controlled heating atmosphere inside the furnace and preserving susceptor's surface from possible oxidation due to accidental inlet of air from the outside of the furnace. Any inert gas may be suitable as a conditioning gas including, but not limited to, helium, argon, and nitrogen, with helium preferred. Typically, said conditioning gas is flown inside the furnace at a flow rate of from about 15 l/min to about 20 l/min. Said conditioning gas diffuses through susceptor into the gap provided between susceptor and insulator and then permeates the insulator. Due to the reduced width of said gap, the conditioning gas disposed within said gap is substantially stationary, i.e., no substantial forced flow of gas is caused to take place within this gap.

Insulating material suitable for a furnace according to this disclosure may also be graphite-based materials, for improving compatibility between susceptor and insulator. Insulating materials differ mainly in density (or porosity), thermal conductivity and resistivity from graphite-based materials employed for the susceptor. In particular, density of graphite insulating materials is lower than about 0.4 g/cm$^3$, preferably lower than about 0.2 g/cm$^3$ (compared with a typical density of at least 1.5 g/cm$^3$ of graphite susceptor materials). Related to the lower density of the insulating materials is their higher apparent porosity, which is higher than about 70%, preferably higher than about 85% (compared with typical values of porosity of susceptor materials of about 20%). Due also to the relatively high porosity, said graphite insulating materials have good insulating properties. The thermal conductivity of these materials is relatively low, as compared with the one of susceptor materials. In particular said thermal conductivity is typically lower than about 1.5 W/m° K, preferably lower than about 1.2 W/m° K in argon atmosphere at 2000° C., and lower than about 0.6 W/m° K, preferably lower than about 0.4 W/m° K in argon atmosphere at 400° C. In order to limit possible electromagnetic coupling with the coil, the graphite insulating material should have a specific resistance substantially higher than the specific resistance of susceptor, preferably of about $1.010^{-3}$ ohm, or higher.

Commercial carbon or graphite felts can be used as insulating materials in a furnace according to this disclosure, such as those commercialized, for instance, by SGL (e.g., Sigratherm KFA5 or KFA10) or by Union Carbide (e.g., National Grade VDG, Grade WDF or Grade GRI-1). As previously said, these felt-like materials are in the form of flexible sheets which need to be coupled with a rigid support. Typically, a sheet of such felt-like material has a thickness of about 5-10 mm and is wrapped around the susceptor for a number of turns sufficient to impart the desired insulating properties, the susceptor being thus employed as a support for the insulator.

Advantageously, for the insulator of a furnace according to this disclosure, a rigid graphite insulating material is preferably used, said material having a sufficient stiffness for being easily shaped into a self-standing cylinder. These materials are typically comprised of graphite fibers, the majority of which is disposed parallel to each other along a preferred direction. In order to be sufficiently stiff and withstand its own weight, said material should have a compression modulus of at least 0.1 Mpa in the longitudinal direction of the fibers, preferably of at least about 0.5 Mpa and up to about 10 Mpa, a compression modulus of about 1 Mpa being particularly preferred. Typically, the insulating cylinder is made from a single sheet of the desired thickness. The sheet is curved to form a cylinder and the two opposite ends of the curved sheet are held in contact to each other, e.g., by means of welding or sewing. The thus obtained insulating cylinder is able to withstand its own weight without collapsing onto the susceptor, thus allowing to maintain the desired gap (preferably about 3-5 mm) between insulator and susceptor. In case when substitution of the susceptor cylinder is necessary, e.g., because of consumption of the same, said susceptor may be easily removed from the furnace body without altering the whole geometry of the structure, thus leaving the insulating cylinder in place.

Examples of suitable materials with the desired characteristics are Sigratherm PR-200-16, PR-201-16 or PR-202-16 (from SGL), CBCF® (Carbon Bonded Carbon Fiber) made by Morganite and UCAR Graphite RIGID Insulation made by Union Carbide. A preferred material for insulator 3 is CBCF®. CBCF® is rigid, of uniform porosity, easily machined and assembled. As previously mentioned, these materials are comprised of graphite fibers disposed parallel to each other along a preferred direction. In the embodiment of this disclosure, the material is formed into a cylinder in such a way as to cause the graphite fibers to be mainly disposed parallel to the axis of the insulating cylinder.

A rigid graphite insulating cylinder according to the invention has a thickness of from about 45 to 60 mm and an inner diameter of from about 150 to about 160 mm According to the preferred embodiment the thickness is about 52 mm and the internal diameter is about 156 mm.

Quartz beaker 4 is a cylindrical quartz tube with an external diameter of about 265-285 mm, about 275 mm in the non-limiting illustrated embodiment, and is disposed to surround insulator 3 and separate the conditioning gas inside the cylindrical susceptor 2 from the conditioning gas surrounding coil 6, when these are different. A top annular plate 25 having a central opening 26 and three concentric grooves in its lower surface is provided at the upper end of beaker 4. A bottom annular plate 27 also having a central opening 28 and concentric grooves in its upper surface is provided at the lower end of the beaker 4. Bottom annular plate houses and supports at least one of the cylindrical susceptor, the cylindrical quartz beaker component, and the insulating material, wherein the furnace body comprises a central longitudinal axis. In preferred embodiments, top annular plate 25 and bottom annular plate 27 comprise quartz. At least one of the ends of susceptor 2, insulator 3 and beaker 4 are housed in the concentric grooves in plates 25 and 27 so that these components are positively and precisely positioned in relation to each other and easily singularly removable. This method of positioning at least one of susceptor 2, insulator 3 and beaker 4 ensures consistent performance from one furnace to another. In the central grooves of the two plates 25 and 27, are inserted annular ridges 29 and 30 formed on the ends of insulator 3. In one embodiment, annular ridges 29 and 30 concentrically align insulator 3 around susceptor 2. In one embodiment, the ends of susceptor 2 are housed within the innermost concentric groove of the two plates 25 and 27. Thus, in one embodiment, bottom annular quartz plate 27 houses and supports the cylindrical susceptor 2, the cylindrical quartz beaker 4, and the insulating material 3.

A hole 46 is typically made through beaker 4, insulator 3 and housing 1 to enable measurement of the temperature of the outer surface of susceptor 2 using a pyrometer set introduced into the furnace through passage 39. Due to the machinability of insulator 3, it is very easy to pierce it. The temperature measured by the pyrometer is used as a feedback parameter to control the power supply of the furnace.

The draw furnace disclosed herein comprises a rotational drive system 50 operably connected to the bottom annular quartz plate 27 by an annular rotation gear system 52, wherein when the rotational drive system 50 is engaged with the annular rotation gear system 52, the bottom annular quartz plate 27 rotates along with at least one of the cylindrical susceptor 2, the cylindrical quartz beaker 4, and the insulating material 3 about the central axis CA at a frequency of from 0.10 to 10 Hz, and preferably from 0.05 to 0.15 Hz, and wherein the level of electrical current and the frequency of oscillating determines the level of heat output of the susceptor 2. In one embodiment, the frequency of rotation is 0.1 Hz.

In one embodiment, the rotation driving system 50 comprises a rotating table 52 comprising gears to engage with gears of a driving motor. In some embodiments, rotating table 52 comprises concentric grooves that matingly receive and, thus, house at least the cylindrical susceptor 2 and the cylindrical quartz beaker 4. In some embodiments, rotating table 52 also includes a concentric groove for the insulating material 3 such that the cylindrical susceptor 2, the cylindrical quartz beaker 4 and the insulating material 3 are integrally installed on the rotating table 52. Preferably, the rotation driving system 50 comprises a computer processing unit (not shown).

Preferably, the rotation driving system 50 rotates the rotating table 52 and, thus, the cylindrical susceptor 2, the cylindrical quartz beaker 4 and the insulating material 3 at a rotation frequency about the central axis CA at a frequency of from 0.01 to 10.0 Hz, or from 0.05 to 0.15 Hz. In some embodiments, the rotation frequency is 0.1 Hz.

An example of such apparatus without the rotational drive system is disclosed in U.S. Pat. No. 7,814,767, which is incorporated herein by reference in its entirety.

Also disclosed herein is a method of distributing heat evenly in a circumferential direction around a susceptor in a furnace during the drawing of a glass element, the method comprising the steps of: heating by induction a drawing furnace by providing an A/C electrical current, the drawing furnace comprising: a furnace body having an upper end comprising an opening and a lower end comprising an opening, wherein the furnace body comprises: i. a top annular plate, ii. an A/C induction coil capable of accepting a level of electrical current and producing an oscillating electronic signal oscillating at a frequency, iii. a cylindrical susceptor capable of producing a level of heat output, iv. a cylindrical quartz beaker, v. an insulating material disposed between the cylindrical susceptor and the cylindrical quartz beaker component, and vi. a bottom annular plate housing and supporting at least one of the cylindrical susceptor, the cylindrical quartz beaker component, and the insulating material, wherein the furnace body comprises a central longitudinal axis; and a rotational drive system operably connected to the bottom annular plate by an annular rotation gear system; and engaging the rotational drive system and the annular rotation gear system to rotate the bottom annular plate such that the bottom annular plate rotates along with at least one of the cylindrical susceptor, the cylindrical quartz beaker component, and the insulating material circumferentially about the central axis at a frequency of from 0.10 to 10 Hz, and wherein the level of electrical current and the frequency of oscillating determines the level of heat output of the susceptor.

The first step of the method is heating by induction a drawing furnace by providing an A/C electrical current, the drawing furnace comprising a furnace body having an upper end comprising an opening and a lower end comprising an opening, wherein the furnace body comprises the features detailed above. As discussed above, the heating takes place inductively as a result of providing an A/C electrical current to the coil 6, which inductively heats the susceptor 2 via a magnetic field created by the electrical current.

The second step of the method is engaging the rotational drive system 50 and the annular rotation gear system 52 to rotate the bottom annular plate 27, the cylindrical susceptor 2, the cylindrical quartz beaker 4, and the insulating material 3 circumferentially about the central axis at a frequency of from 0.01 to 10.0 Hz. The step of engaging the rotational drive system 50 can be performed via a computer processor or by manually engaging an electric motor of the rotation drive system 50. The second step of engaging the rotational drive system 50 and the annular rotation gear system 52 can occur at the same time or the rotation gear system may be engaged before the heating step.

The susceptor, insulation material and glass beaker are capped and aligned by two precisely machined annular plates. In one embodiment, the annular plates are quartz plates. The bottom plate is precisely connected and aligned to an annular rotational gear system below the oven jacket. As the oven jacket is being water cooled and the empty space inside being purged by inert gas, the rotation unit should be able to rotate the susceptor and insulation material with a precise axial alignment.

The disclosed method may further include the step of inserting an optical fiber preform rod and drawing an optical fiber or inserting a cylinder-core rod assembly followed by a preform draw, or a cylinder can be inserted for tube draw. The optical fibers may be solid or hollow core optical fibers. The method of this disclosure is especially suitable for drawing hollow core optical fibers because the method results in a more evenly distributed circumferential temperature profile as will be shown below. Thus, the method significantly reduces if not eliminates the defects in the geometries of drawn hollow core optical fibers.

EXAMPLES

The following Examples were performed to understand the temperature symmetry of the induction furnace through FEM Multiphysics modeling. A full 3D model was built as shown below, considering the key physics involved, including electromagnetic heating (inductive heating), surface to surface radiation exchange, as well as water cooling of the coil.

Assumptions for Coil and Heater Design

Coil Geometry
Diameter=360 mm

Figure 4:
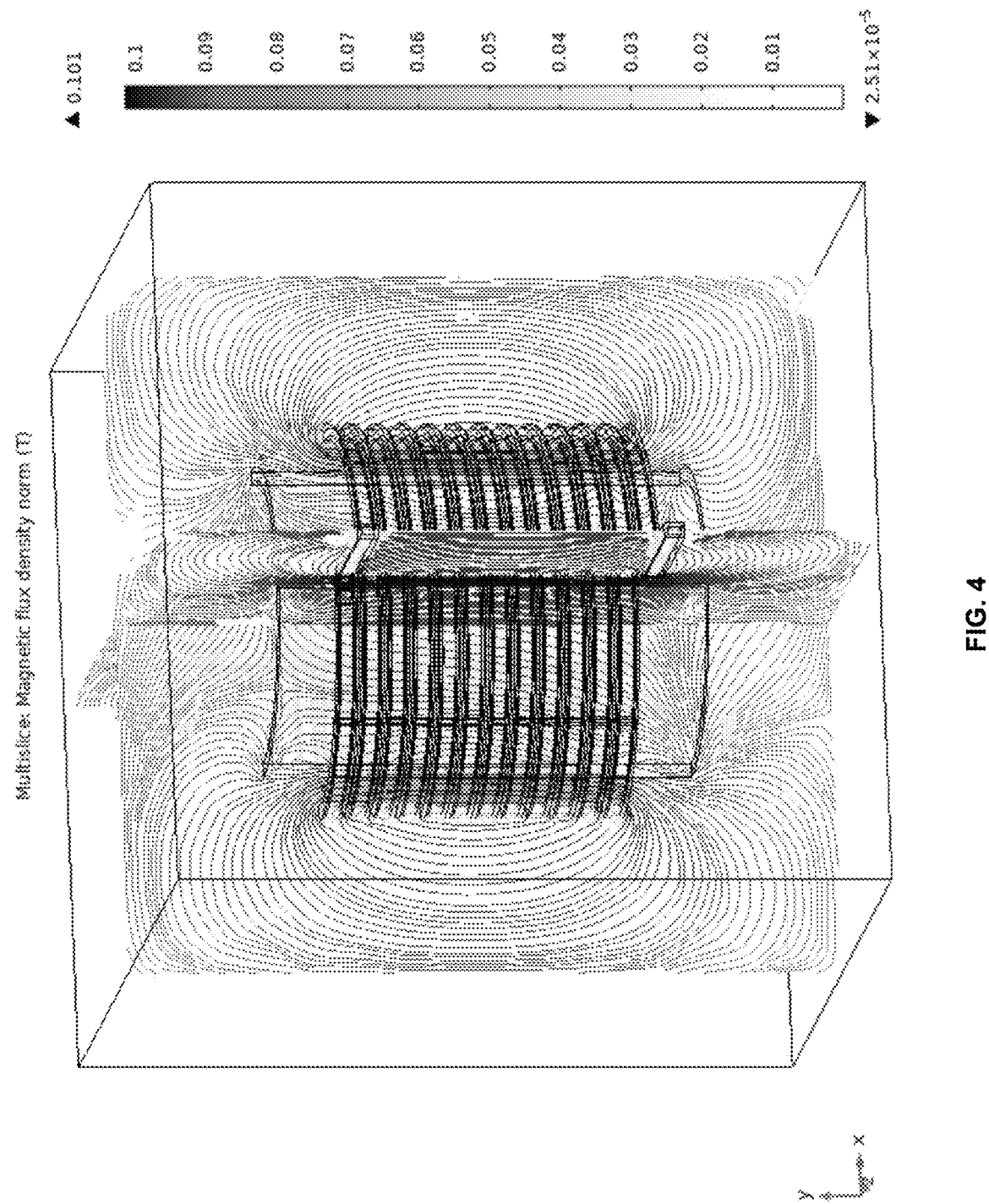
FIG. 4 illustrates a magnetic field density norm diagram.

Height=320 mm
Wire Width=15 mm
Wire Height=20 mm
Cooling Channel Width=8 mm
Cooling Channel Height=13 mm
Graphite Susceptor Geometry
  ID=280 mm
  Height=420 mm
  Wall thickness=14 mm Assumptions for Key Physics Settings Non-linear temperature dependence of graphite properties (electrical & heat conductivity, specific heat) are considered
Heat conduction within the solids
Electromagnetic heating on both the coil and graphite tube
Surface-to-surface radiation BCs on graphite tube and coil, with a background temperature of 1000K (simulate thermal insulation of the heater)
Actual cooling water flow is simulated in the fully coupled model. Inlet temperature is 293K, flow speed is 7.95 m/s (internal channel CSA 8 mm×13 mm), equivalent to the current connector cooling capacity of 13.1 gallons/min
15 kHz, 1.7 kA excitation Magnetic Flux Density Norm Plot (See FIG. 4)

Figure 5:
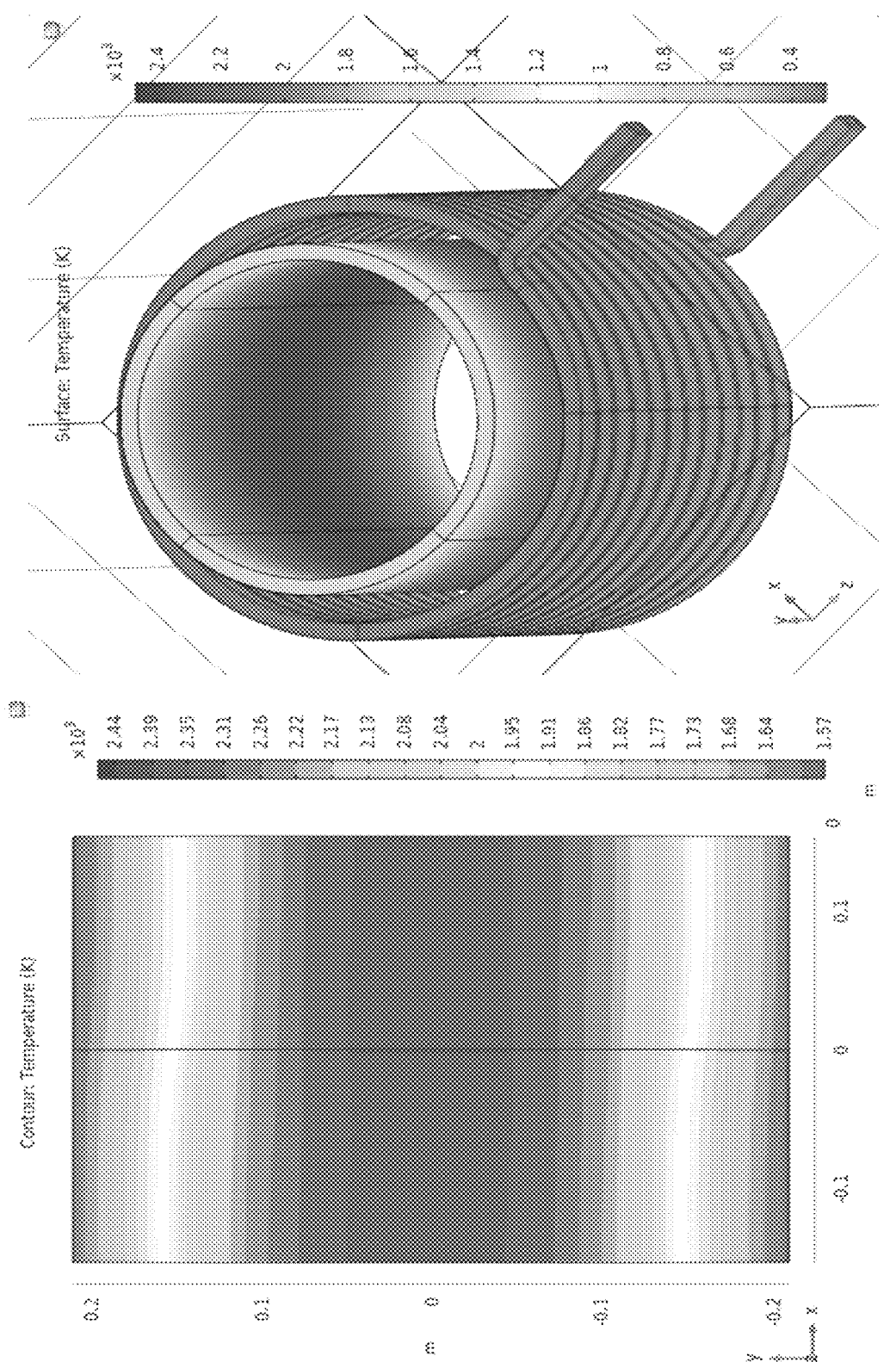
FIG. 5 illustrates the overall temperature profile of the susceptor from Example 1.

Solution of Maxwell Equations
The oscillating excitation current (15 kHz, 1.7 kA excitation) in the coil generates oscillating magnetic field which in turn creates current flow through joule heating from the induced current As a result of the above, the inventors were able to identify the following key factors that can significantly affect circumferential temperature symmetry:

Example 1: Intrinsic Temperature Asymmetry Resulted from the Helical Shape of the Coil As shown in FIG. 5, there is azimuthal temperature asymmetry on the susceptor, following the helical path of the coil, i.e., the temperature contours are tilted with respect to the end faces of the susceptor.

Figure 6:
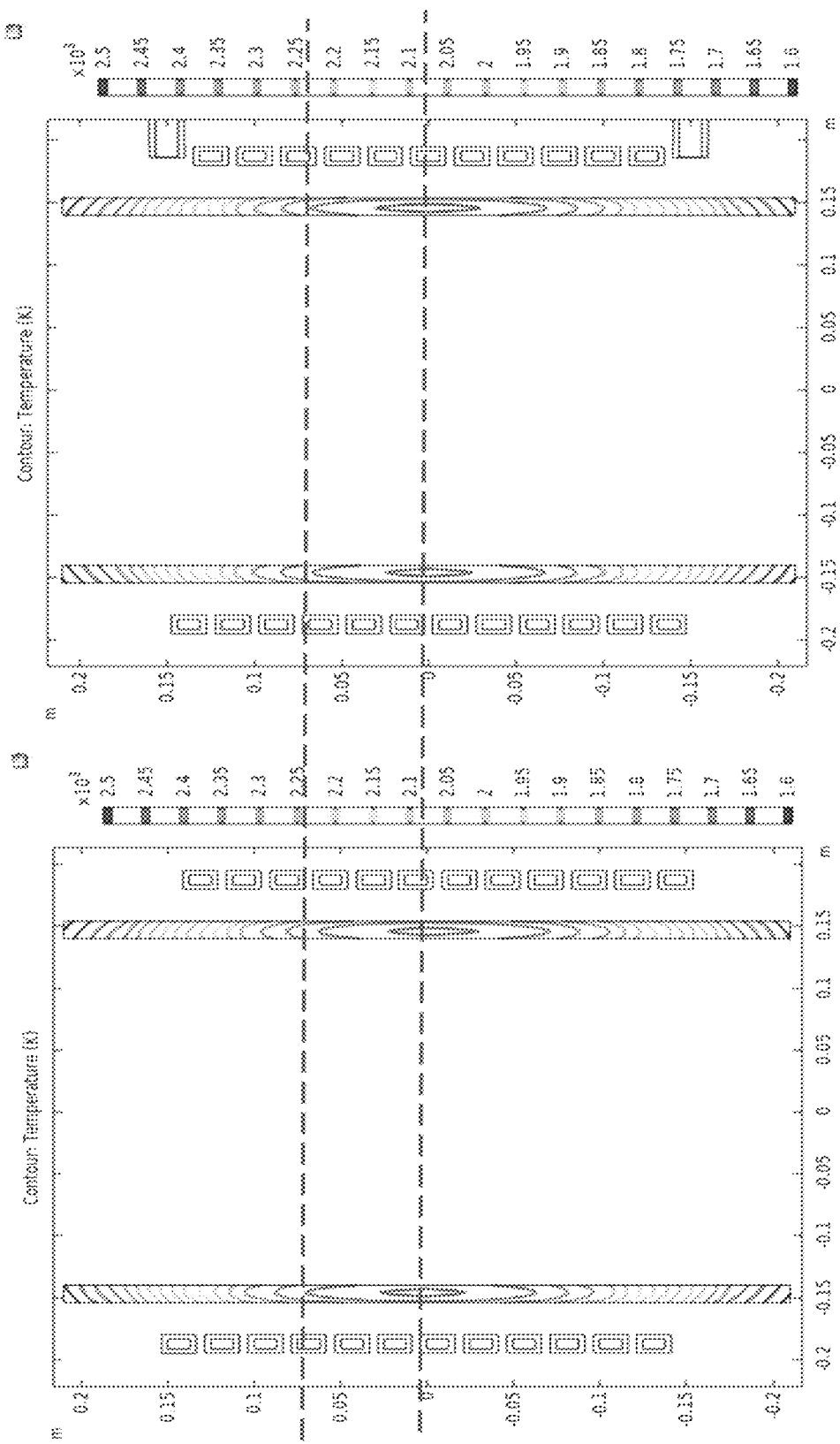
FIG. 6 illustrates the temperature profile on the axial CSA of the susceptor of Example 1.

Looking at the axial CSA temperature profile in FIG. 6, it is clear there is spatial offset of the temperature contours between the left and right of the walls, especially on the CSA perpendicular to the coil leads. This kind of intrinsic and persistent temperature asymmetry can make the glass flow differently on the two sides, which would result in significant level of tube ovality or siding, using tube draw as an example. It could also cause similar problem in geometrical precision in preform draw or fiber draw.

Figure 7:
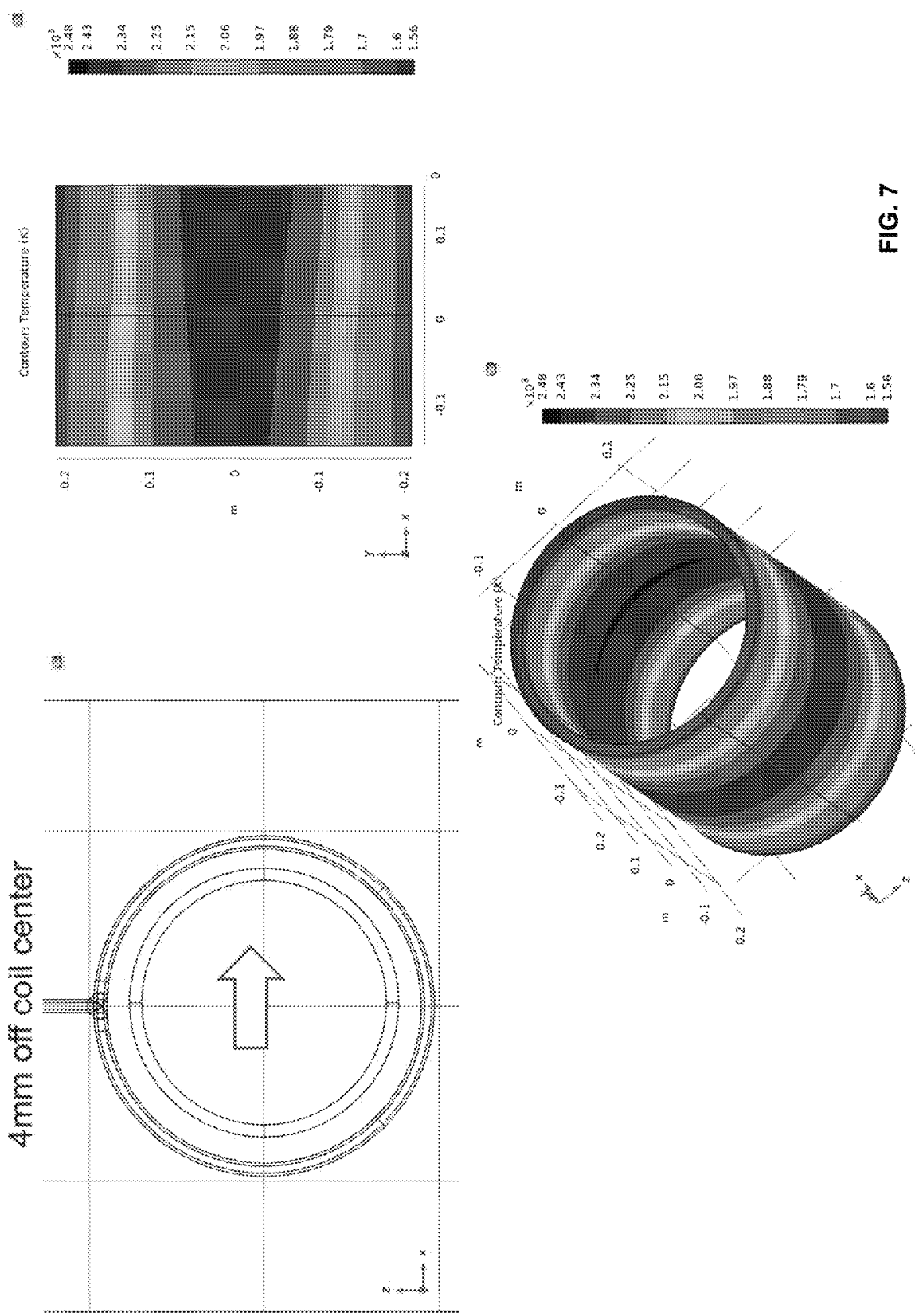
FIG. 7 illustrates the temperature profile of the susceptor when the susceptor axis is off the axis of the coil of Example 2.
Figure 8:
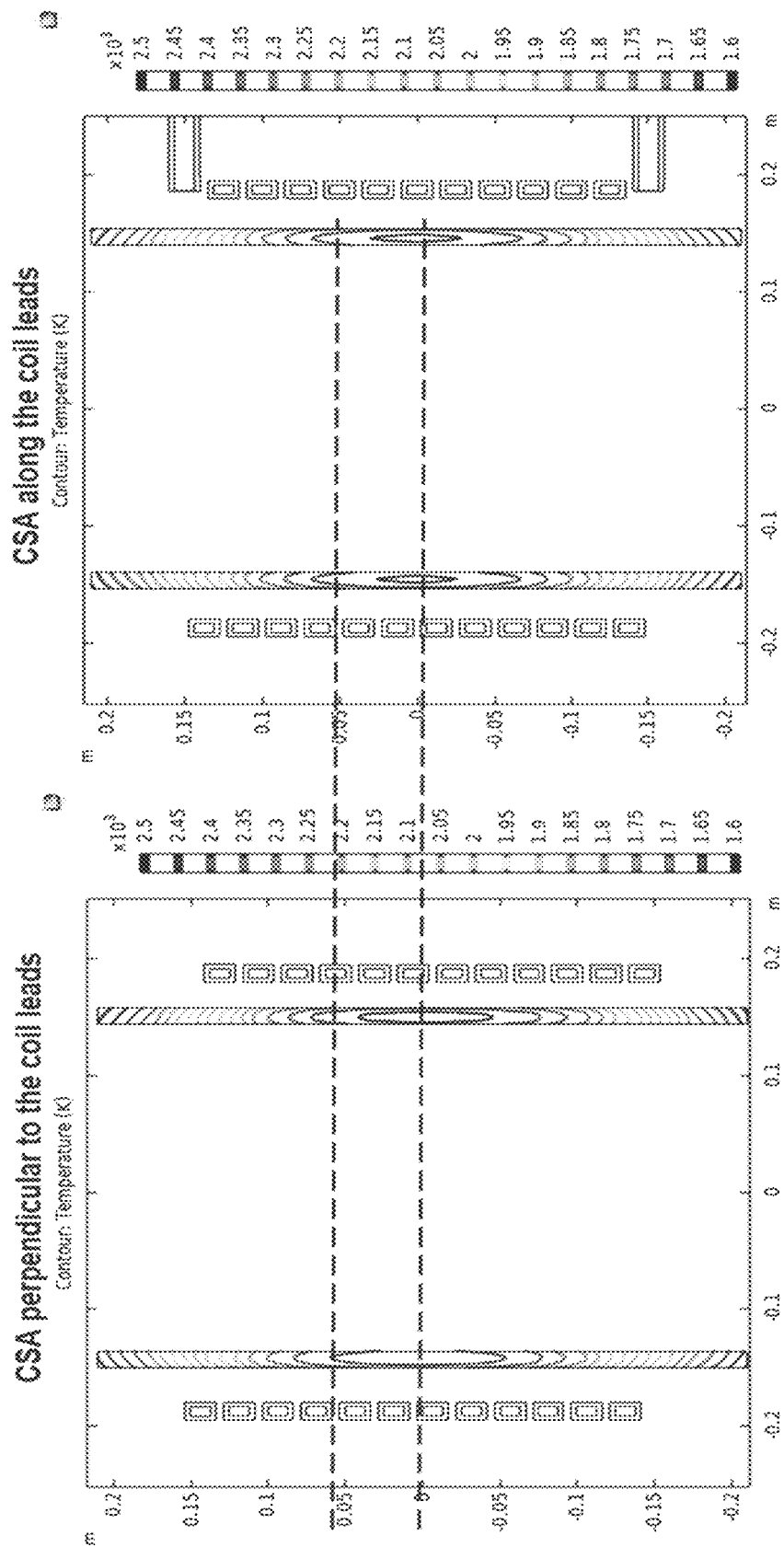
FIG. 8 illustrates the temperature profile on the axial CSA of the susceptor when the susceptor axis is off the axis of the coil of Example 2.

Example 2: Temperature Asymmetry Resulted from Misalignment of the Susceptor Axis with Respect to the Coil Axis As shown in FIGS. 7 and 8, if the susceptor's axis is off the axis of the coil, a significant azimuthal temperature asymmetry can be created depending on the severity of the misalignment problem. This again is a great impact to the axial symmetric geometry precisions of the tube, preform and fiber draws.

Figure 9:
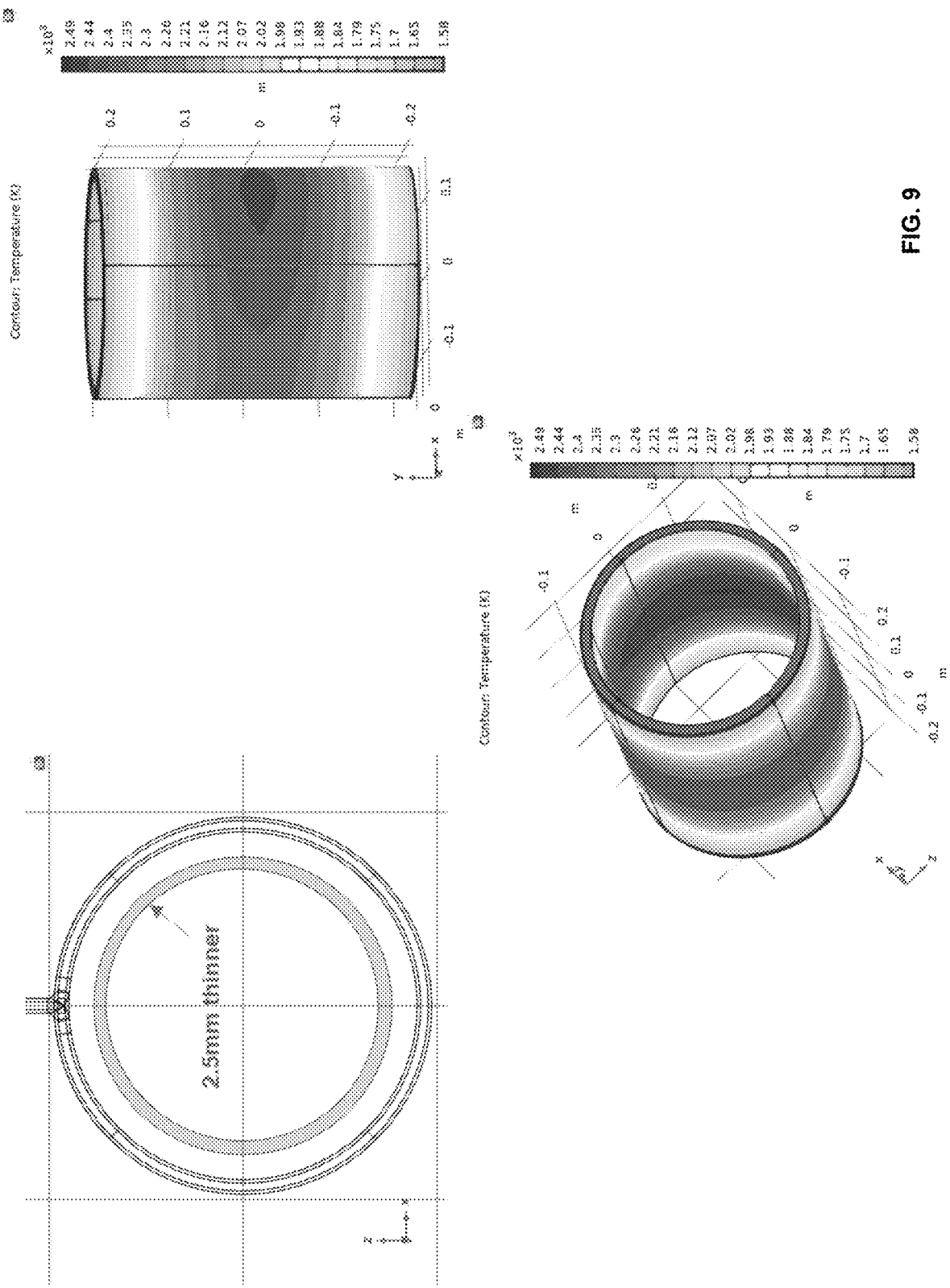
FIG. 9 illustrates the temperature profile of the susceptor when the wall thickness is not uniform of Example 3.

Example 3: Temperature Asymmetry Resulted from Non-Uniform Wall Thickness of the Susceptor As the susceptor ages, due to maintenance effort such as rodding (scrubbing away the SiC growth on the ID surface), the susceptor could become non-uniform. As shown in FIG. 9, with non-uniform wall thickness a hot spot is created at the thinner part of the wall which is a significant temperature asymmetry that can also affect the glass draw precisions discussed above.

Example 4: Solution According to the This Disclosure

Figure 10:
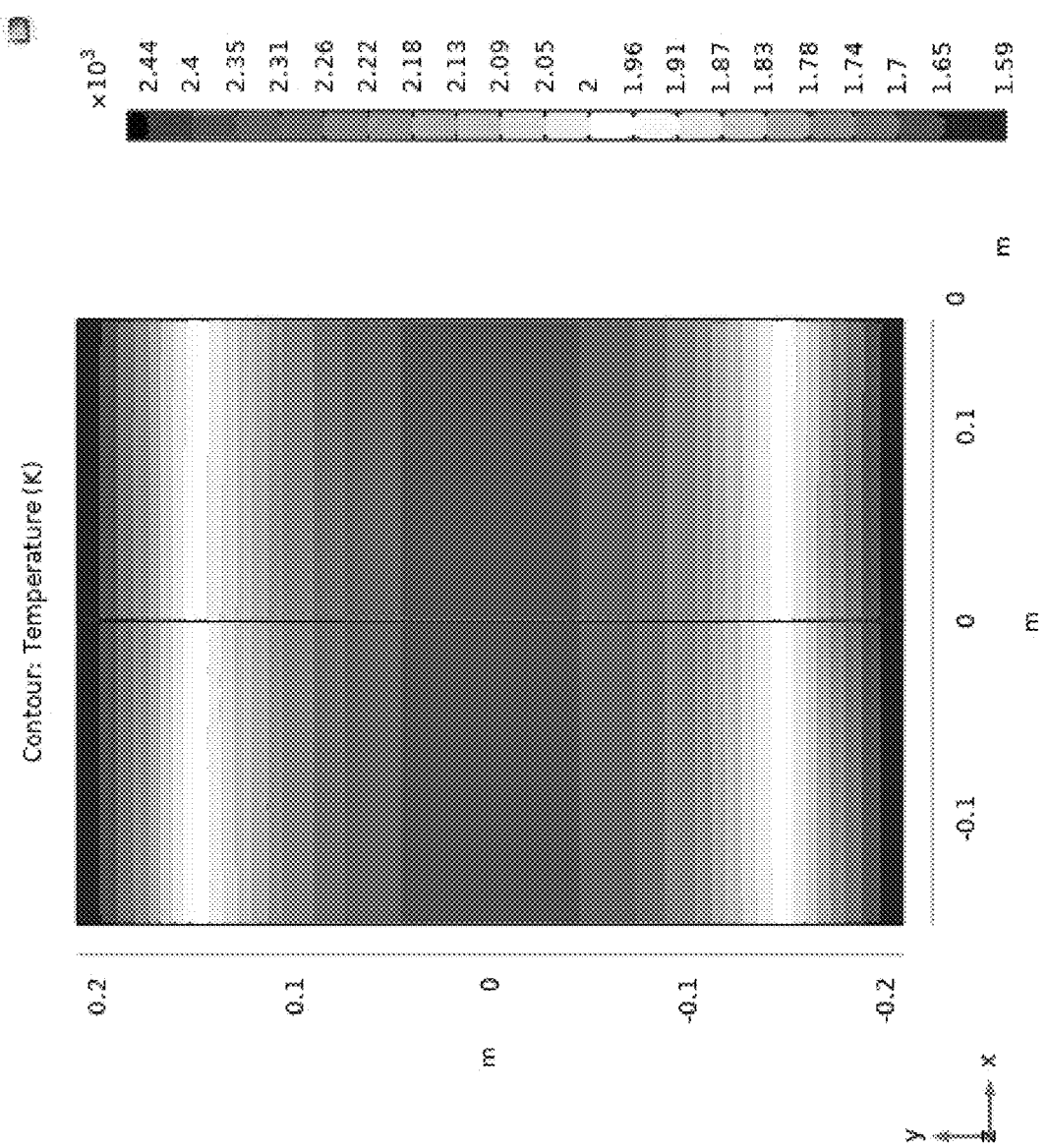
FIG. 10 illustrates the temperature profile of the susceptor with 0.1 Hz rotation according to Example 4.
Figure 11:
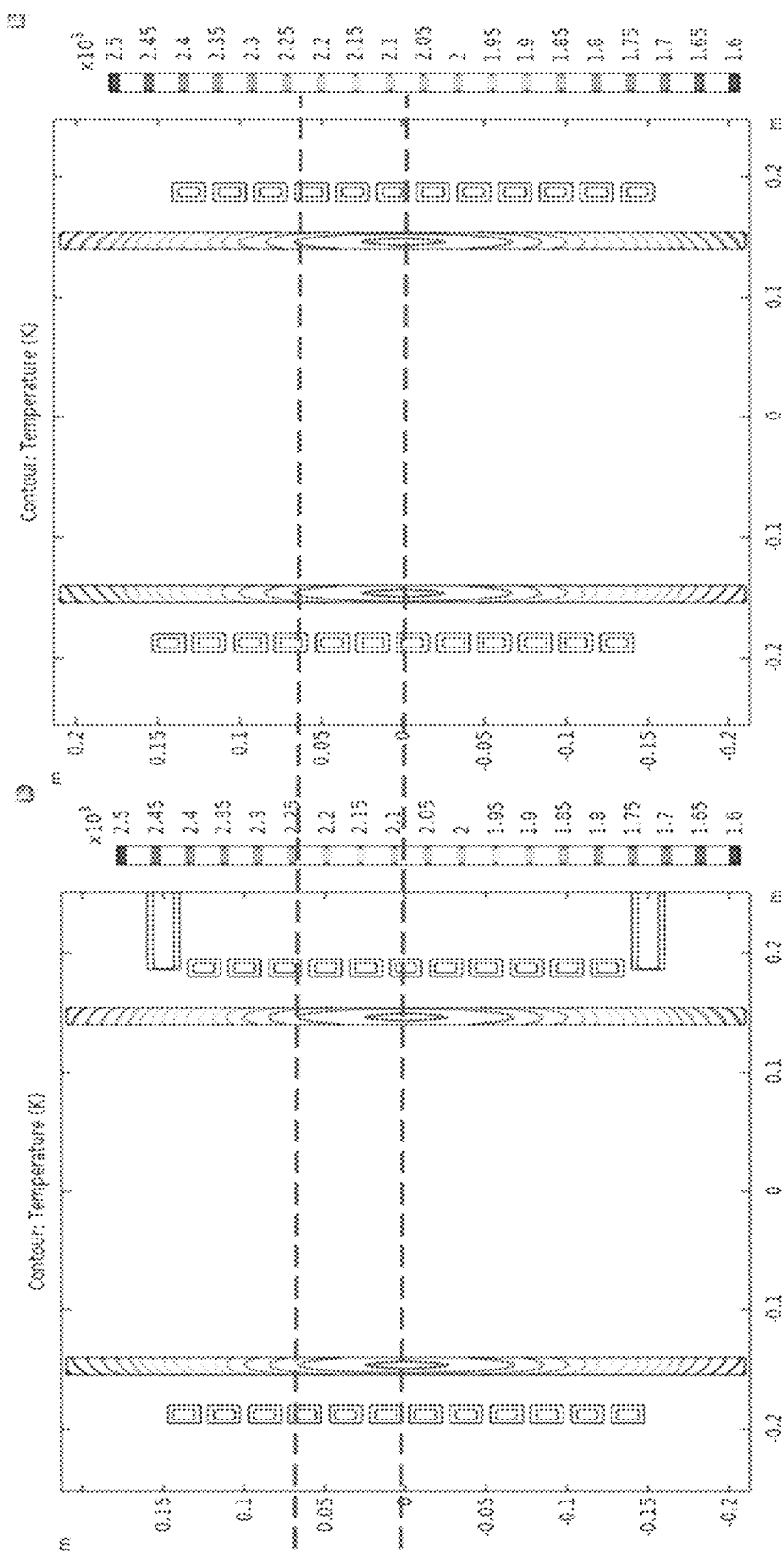
FIG. 11 illustrates the temperature profile on the axial CSA of the susceptor with 0.1 Hz rotation according to Example 4.

The solution to eliminate or significantly reduce the temperature asymmetries described above, is to rotate the susceptor together with potential insulation material between the coil and susceptor, during the inductive heating. The simulation shows that a rotation frequency of 0.1 Hz, a relatively slow rotation speed, is able to improve the temperature symmetry significantly. As shown in FIGS. 10 and 11, the intrinsic temperature asymmetry resulted from helical shape of the coil is almost completely eliminated.

Figure 12:
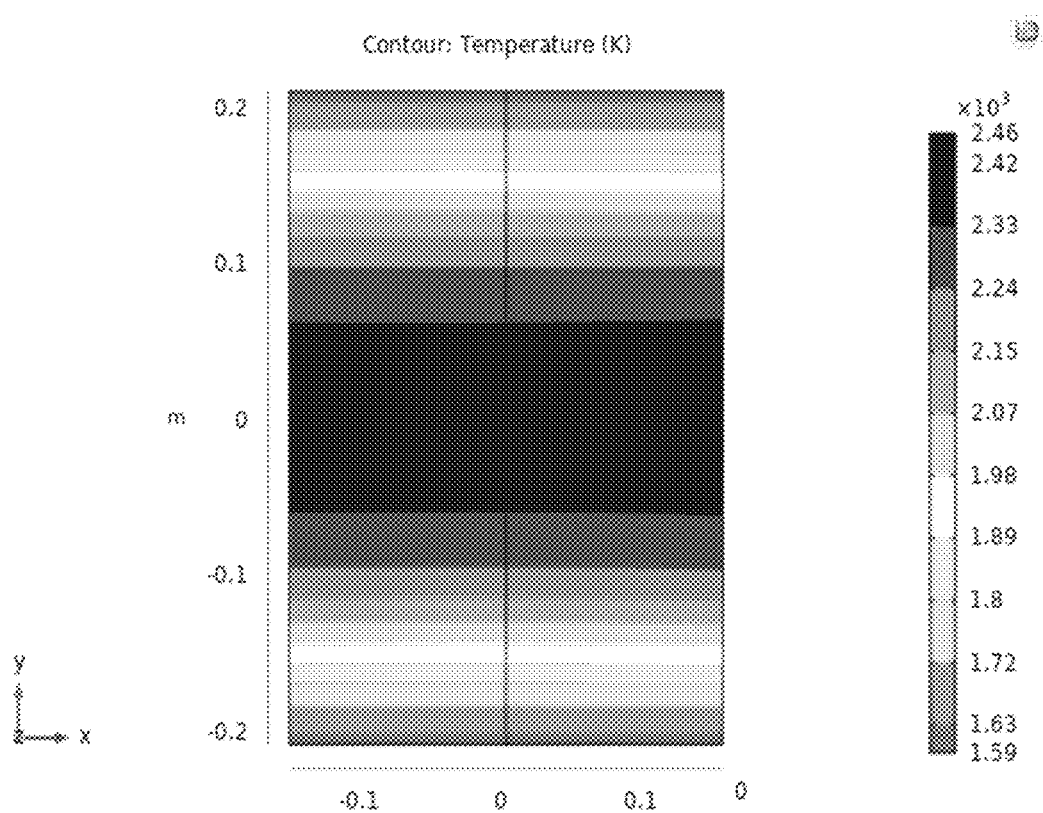
FIG. 12 illustrates the temperature profile of the susceptor with 0.1 Hz rotation when the susceptor axis is off the axis of the coil.
Figure 13:
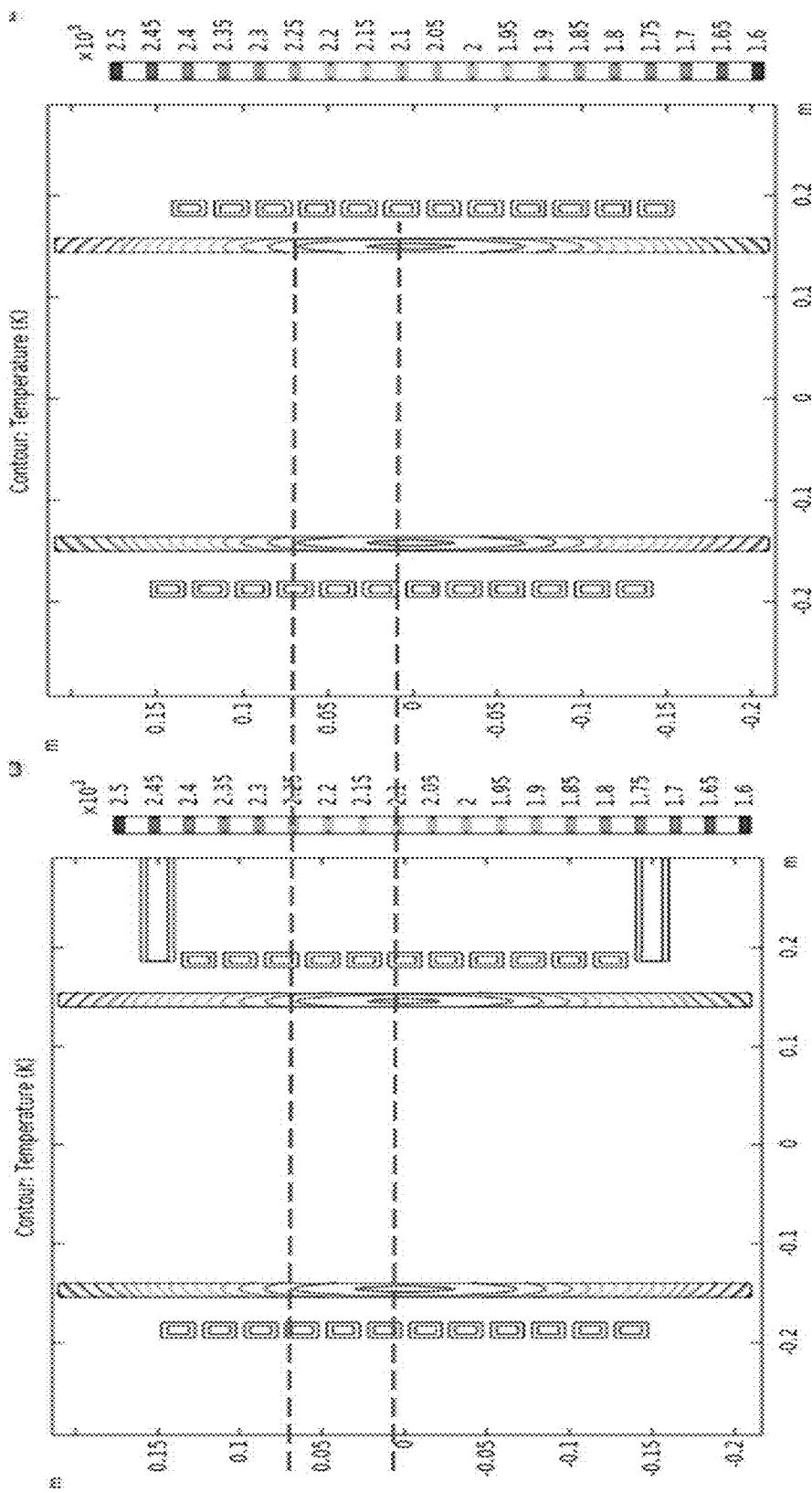
FIG. 13 illustrates the temperature profile on the axial CSA of the susceptor with 0.1 Hz rotation when the susceptor axis is off the axis of the coil.

Example 2 above was repeated except for the rotation of the susceptor at 0.1 Hz and the temperature asymmetry is significantly reduced, as shown in FIGS. 12 and 13.

Figure 14:
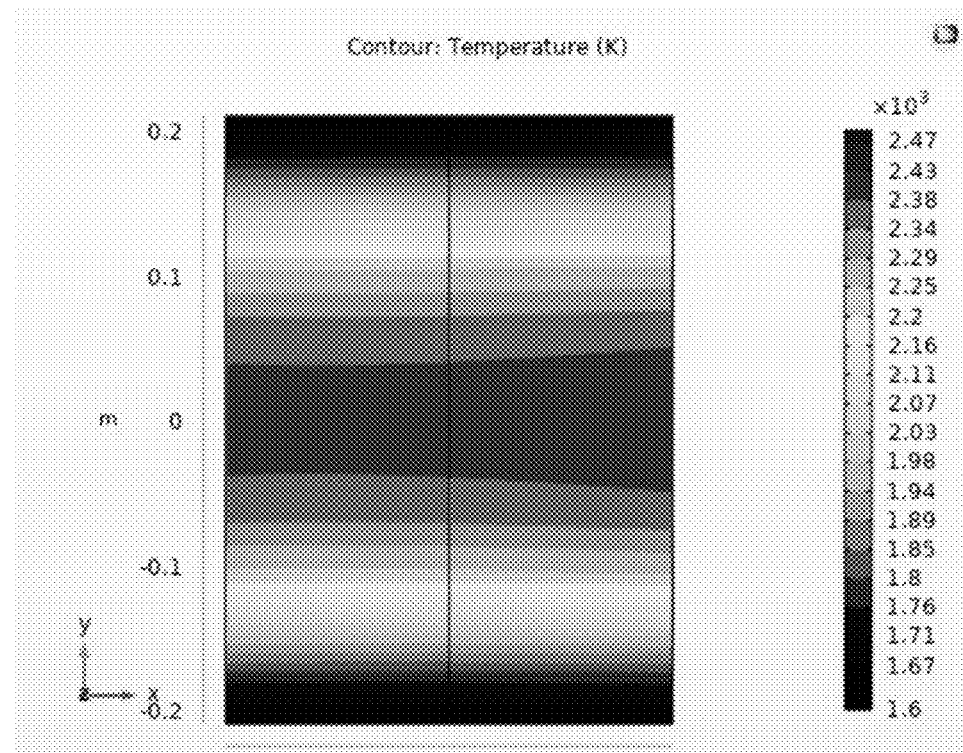
FIG. 14 illustrates the temperature profile of the susceptor with non-uniform wall thickness but where a 0.1 Hz susceptor rotation is added.

Example 3 above was repeated except that the rotation of the susceptor was added at 0.1 Hz and the temperature asymmetry was significantly reduced as shown in FIG. 14.

Also disclosed herein is a method of forming an optical glass element in a furnace, the furnace including a furnace body having a top annular plate, an A/C induction coil, a cylindrical susceptor, a cylindrical quartz beaker, an insulating material disposed between the susceptor and the beaker, and a bottom annular plate, and a rotational drive system operably connected to the bottom annular plate by an annular rotation gear system, the method comprising: introducing a glass body into the furnace body through an opening in the top annular plate; engaging the rotational drive system to the annular rotation gear system and rotating, while drawing the glass body through the furnace body, the bottom annular plate along with at least one of the cylindrical susceptor, the cylindrical quartz beaker, or the insulating material about a central axis of the furnace body at a frequency of from 0.01 to 10 Hz; inductively heating the susceptor via a magnetic field created by the A/C induction coil receiving electrical current; heating the glass body in the susceptor; and feeding the produced optical glass element through an opening in the bottom annular plate. The glass body may be one of a glass preform, a glass cylinder-core rod assembly, a glass cylinder, or the like. The optical glass element may be one of an optical fiber, in particular a hollow optical fiber, or an optical fiber preform, an optical waveguide, a tube, or the like. The rotational frequency may more particularly be of from 0.05 to 0.15 Hz, and more particularly, 0.1 Hz.

The first step of the method includes introducing a glass body into the furnace body F through an opening in the top annular plate 25 (e.g., via the top chimney coupled to the furnace body F). The glass body may be a glass preform, a glass cylinder-core rod assembly, a glass cylinder, or the like.

The second step of the method includes engaging the rotational drive system 50 to the annular rotation gear system 52 and rotating, while drawing the glass body through the furnace body F, the bottom annular plate 27 along with at least one of the cylindrical susceptor 2, the cylindrical quartz beaker 4, or the insulating material 3 about the central axis CA of the furnace body F at a frequency of from 0.01 to 10 Hz, or from 0.05 to 0.15 Hz. In some embodiments, the rotation frequency is 0.1 Hz.

The third step of the method includes inductively heating the susceptor 2 via a magnetic field created by the A/C induction coil 6 receiving electrical current. Using the heat output of the susceptor 2, the fourth step of the method includes heating the glass body in the susceptor 2. The heating step allows the glass body to soften and be drawn into the produced optical glass element, which may be an optical fiber (in particular a hollow optical fiber), an optical fiber preform, an optical waveguide, a tube, or the like. The fifth step of the method includes feeding the produced optical glass element through an opening in the bottom annular plate 27, which in the embodiment shown allows the optical glass element to be withdrawn from the furnace body F via the bottom chimney B.

Certain steps of the method may be initiated in an order different from that recited above. For example, the glass body may be introduced into the furnace body F after the rotation by the rotational drive system 50 is already underway. Similarly, the heating of the susceptor 2 may begin prior to glass body insertion.

A number of embodiments have been described as disclosed herein. Nevertheless, it will be understood that various modifications may be made without departing from the spirit and scope of the embodiments as disclosed herein. Accordingly, other embodiments are within the scope of the following claims.

The invention claimed is:

1. A drawing furnace for drawing a glass element, the drawing furnace comprising:
   a furnace body having an upper end comprising an opening and a lower end comprising an opening, wherein the furnace body comprises:
   i. a top annular plate,
   ii. an alternating current (A/C) induction coil capable of accepting a level of electrical current and producing an oscillating electronic signal oscillating at a frequency,
   iii. a cylindrical susceptor capable of producing a level of heat output,
   iv. a cylindrical quartz beaker,
   V. an insulating material disposed between the cylindrical susceptor and the cylindrical quartz beaker, and
   vi. a bottom annular plate housing and supporting at least one of the cylindrical susceptor, the cylindrical quartz beaker, and the insulating material, wherein the furnace body comprises a central longitudinal axis; and
   a rotational drive system operably connected to the bottom annular plate by an annular rotation gear system, wherein when the rotational drive system is engaged with the annular rotation gear system such that the bottom annular plate rotates along with at least one of the cylindrical susceptor, the cylindrical quartz beaker, and the insulating material about the central axis at a rotational frequency of from 0.01 to 10 Hz, and wherein the level of electrical current and the frequency of oscillating determines the level of heat output of the susceptor.

2. The drawing furnace of claim 1, wherein the bottom annular plate comprises concentric grooves to house at least the cylindrical susceptor and the cylindrical quartz beaker.

3. The drawing furnace of claim 1, wherein the susceptor comprises graphite.

4. The drawing furnace of claim 1, wherein the glass element is one selected from the group consisting of an optical preform, a glass cylinder-core rod assembly, and a glass cylinder.

5. The drawing furnace of claim 1, wherein the bottom annular plate comprises quartz.

6. The drawing furnace of claim 1, wherein the top annular plate comprises quartz.

7. The drawing furnace of claim 1, wherein the rotational frequency is from 0.05 to 0.15 Hz.

8. The drawing furnace of claim 1, wherein the rotational frequency is 0.1 Hz.

9. A method of distributing heat evenly in a circumferential direction around a susceptor in a furnace during the drawing of a glass element, the method comprising the steps of:
   forming a glass element;
   heating by induction a drawing furnace by providing an alternating current (A/C) electrical current, the drawing furnace comprising:
   a furnace body having an upper end comprising an opening and a lower end comprising an opening, wherein the furnace body comprises:
   i. a top annular plate,
   ii. an A/C induction coil capable of accepting a level of electrical current and producing an oscillating electronic signal oscillating at a frequency,
   iii. a cylindrical susceptor capable of producing a level of heat output,
   iv. a cylindrical quartz beaker,
   V. an insulating material disposed between the cylindrical susceptor and the cylindrical quartz beaker component, and
   vi. a bottom annular plate housing and supporting at least one of the cylindrical susceptor, the cylindrical quartz beaker component, and the insulating material, wherein the furnace body comprises a central longitudinal axis; and
   a rotational drive system operably connected to the bottom annular plate by an annular rotation gear system; and
   engaging the rotational drive system and the annular rotation gear system to rotate the bottom annular plate such that the bottom annular plate rotates along with at least one of the cylindrical susceptor, the cylindrical quartz beaker component, and the insulating material circumferentially about the central axis at a frequency of rotation from 0.10 to 10 Hz, and wherein the level of electrical current and the frequency of oscillating determines the level of heat output of the susceptor.

10. The method of claim 9, wherein the glass element is one selected from the group consisting of an optical preform, an optical fiber, and a drawing tube.

11. The method of claim 10, wherein the optical fiber is a hollow optical fiber.

12. The method of claim 9, wherein the frequency of rotation is 0.1 Hz.

13. The method of claim 9, wherein the bottom annular plate comprises quartz.

14. The method of claim 9, wherein the top annular plate comprises quartz.

15. The method of claim 9, wherein the frequency of rotation is from 0.05 to 0.15 Hz.

16. A method of forming an optical glass element in a furnace, the method comprising:

providing a furnace, the furnace including a furnace body having a top annular plate, an alternating current (A/C) induction coil, a cylindrical susceptor, a cylindrical quartz beaker, an insulating material disposed between the susceptor and the beaker, and a bottom annular plate, and a rotational drive system operably connected to the bottom annular plate by an annular rotation gear system; the method comprising:

introducing a glass body into the furnace body through an opening in the top annular plate;

engaging the rotational drive system to the annular rotation gear system and rotating, while drawing the glass body through the furnace body, the bottom annular plate along with at least one of the cylindrical susceptor, the cylindrical quartz beaker, or the insulating material about a central axis of the furnace body at a rotational frequency of from 0.01 to 10 Hz;

inductively heating the susceptor via a magnetic field created by the A/C induction coil receiving electrical current;

heating the glass body in the susceptor to form an optical glass element; and feeding the produced formed optical glass element through an opening in the bottom annular plate.

17. The method of claim 16, wherein the glass body is one of a glass preform, a glass cylinder-core rod assembly, or a glass cylinder.

18. The method of claim 16, wherein the optical glass element is one of an optical fiber, an optical fiber preform, an optical waveguide, or a tube.

19. The method of claim 16, wherein the rotational frequency is from 0.05 to 0.15 Hz.

20. The method of claim 16, wherein the rotational frequency is 0.1 Hz.

* * * * *